US010315759B2

(12) United States Patent
Nemovi et al.

(10) Patent No.: US 10,315,759 B2
(45) Date of Patent: Jun. 11, 2019

(54) MULTI-ROTOR VEHICLE WITH YAW CONTROL AND AUTOROTATION

(71) Applicant: California Institute of Technology, Pasadena, CA (US)

(72) Inventors: Reza Nemovi, San Marcos, CA (US); Robert Bartlett, Kalispell, MT (US)

(73) Assignee: California Institute of Technology, Pasadena, CA (US)

( * ) Notice: Subject to any disclaimer, the term of this patent is extended or adjusted under 35 U.S.C. 154(b) by 584 days.

(21) Appl. No.: 15/089,576

(22) Filed: Apr. 3, 2016

(65) Prior Publication Data
US 2016/0311528 A1 Oct. 27, 2016

Related U.S. Application Data

(60) Provisional application No. 62/143,039, filed on Apr. 4, 2015.

(51) Int. Cl.
*B64C 27/82* (2006.01)
*B64C 27/52* (2006.01)
(Continued)

(52) U.S. Cl.
CPC .............. *B64C 27/82* (2013.01); *B64C 27/08* (2013.01); *B64C 27/14* (2013.01); *B64C 27/28* (2013.01);
(Continued)

(58) Field of Classification Search
CPC ......... B64C 27/82; B64C 27/08; B64C 27/52; B64C 29/0033; B64C 2201/088;
(Continued)

(56) References Cited

U.S. PATENT DOCUMENTS 1,783,458 A * 12/1930 Windsor ............. B64C 29/0033
244/6
1,892,036 A * 12/1932 Campens ................ B64C 27/82
244/17.17
(Continued)

FOREIGN PATENT DOCUMENTS

DE 102005003028 A1 * 7/2006 ............. A63H 27/12
DE 102013109392 A1 * 3/2015 ......... B64C 29/0025
(Continued)

OTHER PUBLICATIONS

International Preliminary Report on Patentability for International Application PCT/US2016/025801, Report issued Oct. 10, 2017, dated Oct. 19, 2017, 6 Pgs.
(Continued)

*Primary Examiner* — Magdalena Topolski
(74) *Attorney, Agent, or Firm* — KPPB LLP

(57) ABSTRACT

A vehicle with superior performance and reliability. The vehicle, such as an unmanned aerial vehicle, is capable of vertical takeoff and landing, uses three swashless, variable-pitch vertical lift main rotors with a yaw tail rotor system. Two rear main rotors are optionally tiltrotors, which pivot to increase forward speed without the increased coefficient of drag inherent in tilting the entire vehicle. The three main rotors are positioned in an equilateral triangular configuration, improving balance, increasing load-bearing strength, and making it more compact in size. Movements are controlled through changes in pitch of the rotors, allowing the motors to maintain constant governed rotations per minute, maximizing drivetrain efficiency. Various embodiments allow for smaller vehicle size with greater performance than prior art vehicles.

19 Claims, 8 Drawing Sheets

(51) Int. Cl.
  *B64C 27/80* (2006.01)
  *B64C 27/08* (2006.01)
  *B64C 39/02* (2006.01)
  *B64C 29/00* (2006.01)
  *B64C 27/14* (2006.01)
  *B64C 27/28* (2006.01)
  *B64C 27/68* (2006.01)

(52) U.S. Cl.
  CPC .............. *B64C 27/52* (2013.01); *B64C 27/68* (2013.01); *B64C 27/80* (2013.01); *B64C 29/0033* (2013.01); *B64C 39/024* (2013.01); *B64C 2027/8209* (2013.01); *B64C 2027/8254* (2013.01); *B64C 2201/024* (2013.01); *B64C 2201/042* (2013.01); *B64C 2201/088* (2013.01); *B64C 2201/108* (2013.01); *B64C 2201/162* (2013.01); *B64C 2201/165* (2013.01)

(58) Field of Classification Search
  CPC ......... B64C 27/54; B64C 27/00; A63H 27/04; A63H 27/06
  See application file for complete search history.

(56) References Cited

U.S. PATENT DOCUMENTS

| | | | | |
|---|---|---|---|---|
| 2,529,629 | A * | 11/1950 | Pullin | B64C 27/54 244/17.23 |
| 2,630,984 | A * | 3/1953 | Ballauer | B64C 27/82 244/17.19 |
| 3,273,653 | A * | 9/1966 | McLarty | B64C 27/08 244/17.23 |
| 3,841,586 | A * | 10/1974 | Broadley | B64C 27/605 244/17.25 |
| 4,367,063 | A * | 1/1983 | Herruzo | B64C 27/80 416/115 |
| 4,506,849 | A * | 3/1985 | Lemont | B64C 27/20 244/17.11 |
| 4,531,692 | A * | 7/1985 | Mateus | B64C 27/10 244/17.19 |
| 4,573,873 | A * | 3/1986 | Yao | B64C 27/59 416/114 |
| 5,624,232 | A * | 4/1997 | Certain | B64C 27/605 416/114 |
| 5,971,320 | A * | 10/1999 | Jermyn | B64C 27/16 244/17.23 |
| 2002/0142699 | A1* | 10/2002 | Davis | A63H 27/04 446/37 |
| 2003/0029965 | A1* | 2/2003 | Kusic | B64C 27/12 244/17.11 |
| 2006/0226281 | A1* | 10/2006 | Walton | B64C 27/20 244/17.23 |
| 2008/0111399 | A1* | 5/2008 | Zierten | B64C 27/605 296/210 |
| 2009/0250549 | A1* | 10/2009 | Wiggerich | B64C 27/20 244/17.11 |
| 2010/0044499 | A1* | 2/2010 | Dragan | B64C 1/30 244/17.23 |
| 2011/0006539 | A1* | 1/2011 | Lefranc | F03D 13/25 290/55 |
| 2015/0037149 | A1* | 2/2015 | Gates | B64C 27/615 416/1 |

FOREIGN PATENT DOCUMENTS

| | | | | |
|---|---|---|---|---|
| FR | 0644941 | * | 6/1928 | |
| FR | 1073268 A | * | 9/1954 | ............. B64C 27/08 |
| GB | 281721 A | * | 8/1928 | ............. B64C 27/82 |
| WO | WO-2008054234 A1 | * | 5/2008 | ............. A63H 23/00 |
| WO | 2016164280 A1 | | 10/2016 | |
| WO | WO-2017035593 A1 | * | 3/2017 | ........... B64C 27/605 |

OTHER PUBLICATIONS

International Search Report and Written Opinion for International Application No. PCT/US2016/025801, Search completed Sep. 6, 2016, dated Sep. 16, 2016, 11 Pgs.

* cited by examiner

MULTI-ROTOR VEHICLE WITH YAW CONTROL AND AUTOROTATION

CROSS-REFERENCE TO RELATED APPLICATIONS

This application claims the benefit of U.S. Prov. Pat. App. No. 62/143,039 filed on Apr. 4, 2015, the entirety of which is hereby incorporated by reference.

STATEMENT REGARDING FEDERALLY SPONSORED RESEARCH OR DEVELOPMENT

This invention was not federally sponsored.

BACKGROUND OF THE INVENTION

Field of the Invention

This invention relates to the general field of rotor vehicles, and more specifically, to an improved design with superior performance and reliability. This invention reduces the overall size and moving parts of prior art rotorcraft, such as helicopters, quadcopters and other manned and unmanned aerial vehicles (UAVs), to achieve superior performance and reliability. The invention, capable of vertical takeoff and landing (VTOL), uses three swashless, variable-pitch vertical lift main rotors with a yaw tail rotor system. The two rear ("aft") main rotors can be, optionally, tiltrotors, which means they pivot to increase forward speed without the increased coefficient of drag inherent in tilting the entire vehicle. This improves the aerodynamic properties of the fuselage. The three main rotors are positioned in an equilateral triangular configuration, improving balance, increasing load-bearing strength, and making it more compact in size. Movements are controlled through changes in pitch, allowing the motor(s) to maintain constant governed rotations per minute (RPM), maximizing drivetrain efficiency. Vehicle configurations disclosed herein allow for smaller vehicle size with "greater performance" (i.e. more agility, more power, faster response to pilot/flight controller inputs, and a stronger, more rigid, and yet lighter-weight structure) than prior art vehicles.

History of the Invention's Industry

Prior art single rotor and multi-rotor vehicles have dominated the marketplace. Since the Wright Brothers first took flight and Jacques Cousteau explored our oceans, humans have relied on innovative transportation to solve challenging problems. Today, the convergence of technology and transportation is creating new, safer and more efficient modes of transportation. Breakthroughs in autonomous systems are revolutionizing ground-based travel, but innovation around legacy rotorcraft designs, like helicopters, has not been updated.

Along with the overnight popularity, some consider current UAS to have serious problems. One such problem is battery life. Most of the currently popular drone models have a battery life of around twenty minutes. This is problematic as it often takes several minutes just to get the drone airborne and in position to begin its mission. Considering that safe operations usually require at least five minutes of buffer time between when you expect to land and when the battery runs out, this often leaves between ten and fifteen "useful" minutes of operation. Considering the relatively slow horizontal speed of many drones on the market today, this severely limits the distance a drone can be flown to accomplish a mission. Some of the short battery life is due to the batteries themselves, but other reasons include that fact that most drones today are not engineered very efficiently.

Another issue faced by people and groups ranging from hobbyists to search and rescue personnel is that most "drones" work only in the air, while most "submersibles" work only in the water. Thus, it would be desirable to have a single unmanned system that could both fly in the air and move underwater.

Thus there has existed a long-felt need for a vehicle that can avoid all of the aforementioned problems. The current invention provides just such a solution by having an improved vehicle with three "vertical" propellers for which the pitch can be adjusted, but which can operate at full or nearly full capacity throughout the flight. By not controlling the elevation and direction/location of the drone by changing the speed at which various propellers spin, the invention provides a more efficient operation, which not coincidentally helps to give the operator a longer battery life. The invention also has a fail-safe automatic disengage system that disengages the propellers from the power plant in case of engine failure. This allows the unit to auto-rotate, similar to the auto-rotation that a helicopter undergoes when it loses power. The vehicle also has a variable pitch yaw system that provides superior control to the prior art which teaches the use of the four propellers to control yaw.

Market Potential

Aerial transportation does not share the infrastructure requirements of ground-based transportation solutions. This is particularly valuable in high population density areas where traffic congestion increases costs and limits the efficiency of prior art transportation. The utility of efficient aerial vehicles capable of three-dimensional travel and VTOL will revolutionize the transportation of goods and people.

Challenges

Unmanned Aerial Systems (UAS) have introduced a wave of new technology. UAS have demonstrated potential in reducing costs and risks with driverless solutions, but cannot compete with the utility of traditional rotorcraft. UAS, traditional rotorcraft and other prior art solutions have inherent safety and reliability limitations in their fundamental designs, which prevent usability in industries such as transportation with high safety and reliability requirements. An increase in hardware and software complexity has arisen to compensate for these shortcomings. This invention remedies these deficiencies with a completely novel design that meets the safety and reliability standards of human transportation by integrating technology from both traditional rotorcraft and state-of-the-art UAS.

Unique Vehicle Configuration

This invention has identified an ideal vehicle configuration with fixed geometric relationships (see FIG. 2), allowing for a scalable design that integrates the best aspects of prior art designs into one vehicle and can accommodate a variety of use cases through customization with modular components. The superior performance of the vehicle is a direct result of the marriage of the following features:

Active Main Tri-Rotor Systems
Stability
Form Factor (size)
Swashless Variable Pitch Rotor Management System
Autorotation
Tiltrotors
Active and Independent Yaw Tail Rotor System
Redundant system
Modular Design
Fuselage Payload Capacity Monocoque Amphibious Equilateral Triangular Rotor Configuration The vehicles according to the current disclosure use a tri-rotor design, the minimum number of rotors required to achieve maneuverability through variable pitch, the most efficient system for rotorcraft control. The use of three smaller main rotor heads, as opposed to one large helicopter rotor head, creates the same lift with the same surface area but reduced size and mass, improving stability and efficiency. The equilateral triangular orientation of the main rotors keeps the relationships in vehicle dynamics fixed around the center axis during maneuvers, providing maximum stability. Spinning smaller rotor blades compared to a single rotor vehicle with the same rotor blade surface area allows the vehicle to achieve higher rpm due to lower rotational mass at the rotorhead. This creates more relative lift per unit of rotor blade surface area and greater stability without increasing torque, minimizing the requirement for torque management from the yaw tail system. The use of different rotor blade designs like semi-symmetrical blades further improves the efficiency and lift capabilities as rpm increases.

Independent Main Rotor Systems

The aerial environment of a vehicle is in a constant state of change, requiring a vehicle capable of adapting to constant change in order to perform even the simplest tasks, like holding position. This vehicle uses independent rotor systems for each of the three main rotors to address disparities in the flight conditions for each individual rotor. Allowing each rotor to act independently improves the performance. This vehicle is the only one to combine a multirotor vehicle with variable pitch, independent and active rotor systems, and the safety benefits of autorotation.

Active Main Rotor Systems

Building on the ability of each main rotor drive system to act independently is the ability to actively adjust each rotor system to cope with highly dynamic environments and the performance-sapping hazards of retreating blade stall. The more extreme the operating conditions (wind speed, precipitation, etc.) and the higher the speed of an aircraft maneuver, the greater the differential between leading and trailing rotor blades within each rotor and also the differential between each rotor in the trirotor configuration, causing a vehicle without an active ability to adapt to stall and lose control. Actively regulating the performance characteristics of each rotor prevents the vehicle from losing performance in operating environments that would disrupt the stability, balance and efficiency of prior art rotorcraft without active systems. In the event that a main drive rotor becomes obstructed, the vehicle's active and independent drive systems will utilize the remaining drive rotors to perform an emergency landing by yawing the aircraft around its central axis and balancing the vehicle in a constant circular rotation.

Stability

Helicopters and rotary UAVs both have VTOL capability, but designs are limited by retreating blade stall. Retreating blade stall results from the disparity between leading and trailing blades in a rotor. The leading blade spins into the direction of oncoming airflow generating lift and positive velocity, but the trailing blade spins in the opposite direction of airflow generating less lift and negative velocity, or drag. The faster the speed of flight, the higher the possibility that this disparity in lift caused by retreating blade stall will upset the stability of the vehicle. This invention primarily eliminates retreating blade stall by using an equilateral triangular rotor configuration along with independent and active rotor systems to distribute and balance the effects of drag across the vehicle's three rotors to negate the adverse effects of retreating blade stall.

Form Factor

This tri-rotor configuration has smaller packaging and requires less components than a single rotor, with a minimal multi-rotor setup, it is the most efficient configuration for a rotorcraft of the same size.

Variable Pitch

Variable pitch is the key to the superior performance of our vehicle design. Lift is controlled through a variable pitch system, meaning the motors run at a fixed optimal rpm, able to adjust pitch to execute maneuvers with faster responses to the pilot's inputs ("low-latency") compared to prior art systems. This eliminates more moving parts compared to prior art, further increasing reliability and efficiency, in addition to increasing reaction times, precision and control. It is possible to further improve the benefits of variable pitch design by reducing pitch on trailing blades through new rotor head designs to eliminate drag using low-latency magnetic actuators to adjust the pitch of individual blades as they are rotated. The minimal latency of a variable pitch system maximizes the performance of any avionics installed on the vehicle.

Swashless Rotor System

This invention removes the complexity of conventional helicopter main rotor systems, by removing the swashplate system and significantly reducing the number of moving parts. The equilateral triangular rotor system effectively acts as a larger and more robust swashplate, replacing the need for a swashplate on the rotor shaft. This allows for a shorter rotor shaft, reducing the pendulum effect that results in instability, wear and packaging inefficiency of longer rotor shafts of prior art rotor vehicles. Removal of the swashplate reduces latency in reaction times because the mechanical responses are direct and do not have to pass through an additional swashplate component. In addition to saving weight, the elimination of unnecessary moving parts reduces the lag, wear and inefficiency of the entire system, while streamlining the drivetrain to be more reliable and compact.

Autorotation

Engines, batteries and other power sources can fail, but prior art designs, with the exception of helicopters, often have no provisional safety features to allow safe landing without a power source. In traditional UAS, when the battery fails, the vehicle normally just drops out of the sky, potentially endangering any people or property that happens to be underneath. This danger has been the driving force behind governing bodies like the FAA's support of restrictions over populated airspace. Fixed wing designs can land without a power source, but require runways, which are not always available in an emergency. Autorotation on all 3 rotors, means that our vehicle can land itself safely in the unlikely event of a drivetrain failure. Autorotation uses ambient air pressure and the force of gravity to rotate the blades, providing enough lift to avoid the vehicle from falling out of the sky. Instead it allows for a controlled landing, even without an active drivetrain. The one-way hub system works like a freewheel, allowing the rotors to spin freely when the motor(s) are disengaged. The force exerted by gravity on the vehicle is enough to force airflow around the rotor blades, causing them to spin and generate sufficient lift to safely land the vehicle. This mechanical redundancy eliminates the need for backup systems and reserve powertrains, further reducing the required weight and complexity of the vehicle, in order to safely land in case of an emergency. Mechanical redundancy is instantaneous and minimizes reliability and latency issues should adverse events occur and require an emergency landing.

Tiltrotors

Aerial vehicles have always been challenged by the conflicting tasks of takeoff and flight. Vertical takeoff is the most desirable form of takeoff because it requires minimal space and provides maximum control over stops and turns, but, once in flight, it is forward thrust that is required. With traditional UAS, an exclusive choice must be made between vertical or horizontal design efficiency. This is an inherently inefficient situation. In this invention, the two main aft rotors of the main rotor configuration are tiltrotors, capable of articulating into a forward position when in forward flight to optimize thrust. When combined with the aerodynamics of the monocoque, this forward motion generates additional lift and increases the efficiency and performance envelope of the vehicle.

Yaw Tail

The use of a yaw tail in this invention allows the vehicle to maintain directional stability under extreme environmental conditions and maneuvers, as well as improving precision and agility. Lack of directional control causes prior art designs to become increasingly unstable in adverse conditions and advanced maneuvers. The independent and active yaw control system combines the best features of prior art designs to maximize the benefits of this vehicle's configuration. Non-independent prior art designs with limited yaw control are primarily focused on counteracting engine torque, an inefficient use of vehicle's energy which adversely impacts main rotor performance as well.

Torque Management

Prior art fixed pitch multirotor UAS rely on changing opposing motor RPM to counter torque and manage yaw, while variable pitch multirotor UAS rely on changing pitch of opposing rotors to counteract torque and manage yaw. This approach to achieving yaw control is inefficient and destabilizes the vehicle. Single rotor helicopters spin their blades in one direction, requiring a yaw tail rotor to cancel this twisting force, or torque, that would otherwise destabilize the vehicle. A three rotor setup also requires an active yaw system, but is even more efficient because the aft main rotors spin in opposing directions, cancelling each other out. This means that the yaw control in our tri-rotor configuration only has to cancel the torque of the front main rotor since the aft main rotors spin in opposite direction, which is smaller and requires less energy compared to a single rotor with greater blade surface area, while maintaining directional stability and efficiency during maneuvers.

Independent Yaw System

This invention improves performance and efficiency, reducing the loss of control through the use of a separate electric motor to drive the independent yaw control system in the tail. Instead of counteracting main drive torque, this design maintains full control in all conditions and maneuvers through the use of an independent and active system. Also, by directly driving the tail rotors, many parts are eliminated currently used in conventional helicopters, (i.e. torque tube, gears, u-joints, gearbox) which are common wear items and failure points.

Active Yaw System

Similar to the independent and active systems on the main rotors, using an active yaw system further improves efficiency and performance in adverse conditions. Because the tail rotor's active yaw system is independent from the main rotors' drivetrain, it does not steal power from or compete with other systems inside the vehicle. Instead, because there is no mechanical linkage to the main rotors, the active yaw can turn itself off completely or change rpm and pitch to counteract undesired forces. The limits of the yaw system are determined by the rotorhead configuration, which can be modified to meet customer needs in our modular design. It also maintains steering control should a failure occur in the main rotor system, resulting in an autorotation landing.

Redundant Systems

Backup systems for mechanical components are integrated into the design to significantly reduce the risk of catastrophic failure to. These redundant systems can apply to any aspect of the vehicle and be mechanical, magnetic, electronic, hydraulic, physical and software-based. One example of such innovations on the vehicle is the redundant dual servo system for the yaw tail rotor and the main tri-rotor systems.

Modular Design

Particular embodiments provide for the central section of the vehicle being a modular fuselage. Because this fuselage houses all of the interchangeable electronics and components, this modular central section can be switched to accommodate different setups for specific industries or applications. In addition to the swappable electronics, this swappable section can be used to change the vehicle power source and allow for other custom modifications based around the same universal platform. In larger models, this detachable central compartment can include a passenger compartment, along with all the required components and safety equipment to transport live cargo. The three identical rotor arms and interchangeable rotors also allow for modular customization to a variety of use case specifications, including future innovations in fan-bladed rotor systems. Similarly, the yaw configuration can be customized to accommodate a variety of single rotor and multirotor specifications. Because this vehicle does not require any electronics as part of its basic configuration, it is an open platform that is compatible with any electronics or avionics solutions.

Fuselage

The vehicle fuselage is a modular weight bearing structure. In addition to housing all of the vehicle components, the fuselage creates the common linkage for all of the vehicles modular components and directs weight towards the center of gravity. The fuselage can be sealed to become watertight, or even padded to produce a secure Faraday Cage. Adaptations of the fuselage will allow for a variety of loadbearing and non-loadbearing applications.

Payload Capacity

Employing a weight bearing structure as the fuselage harnesses the vehicle's payload capacity to add new levels of utility and potential applications for this vehicle design. Helicopters were designed to carry loads inside of their passenger compartment, although some have been adapted to allow for external loads. Prior art UAS have not been designed to carry payloads competing with helicopters. This invention was built from the ground up, utilizing a weight bearing fuselage to support the suspension of heavier external loads relative to prior art designs.

Monocoque

In place of a fuselage, the vehicle can utilize an aerodynamic monocoque. The monocoque minimizes energy consumption when in motion by generating aerodynamic lift when in flight, or underwater. The monocoque also reduces the overall weight of the vehicle and channels airflow over the heatsinks of heat sensitive components to maximize thermodynamic performance when in motion. The monocoque is also designed to simultaneously accommodate internal components and create the padded vehicle legs that allow the vehicle to land safely in the event of an emergency landing over water or solid ground.

Amphibious

Due to the nature of fluid dynamics, aspects of the current disclosure are identical for submersible vehicles. The vehicle can be sealed with a superhydrophobic nanocoating, or other treatment, and allows for the optional addition of ballast tanks to provide submersible operation. Even without the optional ballast tanks, the vehicle can float on the surface of water in the event of an emergency landing or maritime operation.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future. Furthermore, the use of plurals can also refer to the singular, including without limitation when a term refers to one or more of a particular item; likewise, the use of a singular term can also include the plural, unless the context dictates otherwise.

The presence of broadening words and phrases such as "one or more," "at least," "but not limited to" or other like phrases in some instances shall not be read to mean that the narrower case is intended or required in instances where such broadening phrases may be absent. Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

OBJECTS OF THE INVENTION

It is therefore an object of the present invention to provide an efficient, reliable and agile vehicle capable of heavy lifting that can operate in both air and water with superior performance and adaptability to prior art vehicles.

BRIEF DESCRIPTION OF THE FIGURES

The accompanying drawings, which are incorporated in and form a part of this specification, illustrate embodiments of the invention and together with the description, serve to explain the principles of this invention.

DETAILED DESCRIPTION OF THE FIGURES

Figure 1:
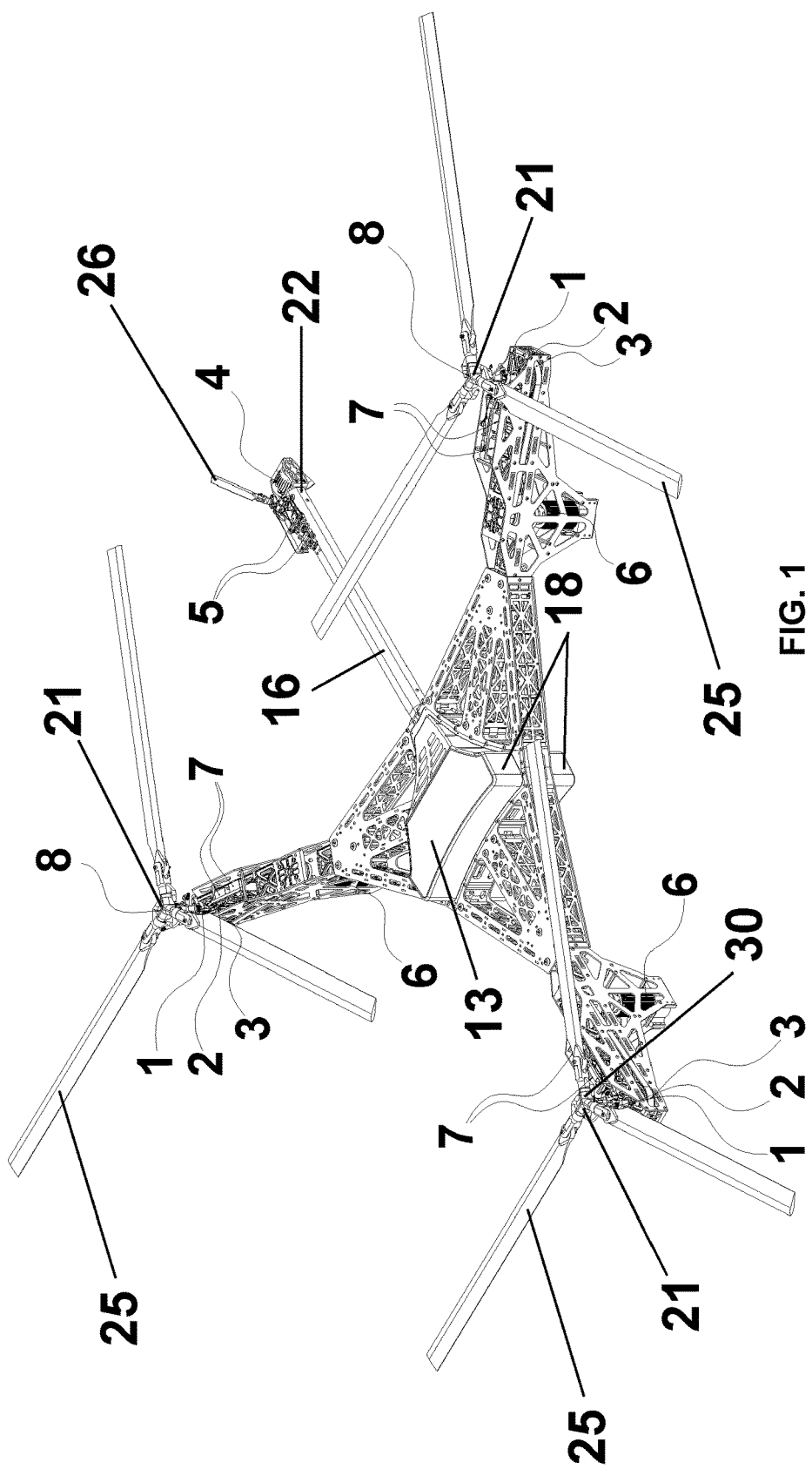
FIG. 1 is a perspective view of a vehicle according to selected embodiments of the current disclosure.

Many aspects of the invention can be better understood with references made to the drawings below. The components in the drawings are not necessarily drawn to scale. Instead, emphasis is placed upon clearly illustrating the components of the present invention. Moreover, like-reference numerals designate corresponding parts through the several views in the drawings. Before explaining at least one embodiment of the invention, it is to be understood that the embodiments of the invention are not limited in their application to the details of construction and to the arrangement of the components set forth in the following description or illustrated in the drawings. The embodiments of the invention are capable of being practiced and carried out in various ways. In addition, the phraseology and terminology employed herein are for the purpose of description and should not be regarded as limiting.

REFERENCE NUMBERS USED

1—Swashless Pitch Slider
2—Autorotation Hub
3—Gear
4—Independent and Active Rotor Drive in Yaw
5—Redundant System Servos in Yaw
6—Independent and Active Rotor Drive in Main
7—Redundant System Servos in Main
8—Rear Main Rotor Systems
9—Equilateral triangle
10—Dual Rotor
11—Tiltrotor
12—Fuselage
13—Main Body
14—Pitch Slider (Yaw)
16—Yaw Arm
18—Electronics Housing
21—Main Rotor System
22—Yaw Rotor System
25—Propeller (Main)
26—Propeller (Yaw)
30—Front Rotor System The aerial vehicle, according to selected embodiments of the current disclosure, has some traditional, and some very untraditional components. There is a base, that houses the battery, software, and other parts of the "brains" of the vehicle. There are three propeller arms, that serve to locate three propeller blades a set distance away from the base and each other. In direct contrast to the prior art, embodiments of the vehicle disclosed herein also has a yaw control arm that is attached to a vertically oriented yaw blade, which is a propeller that controls the yaw of the vehicle.

FIG. 1 is a perspective view of a vehicle according to selected embodiments of the current disclosure. As can be seen in this figure, when the propellers 25 of the main rotor systems 21 are moving the vehicle forward or backward, the yaw propeller 26 of the yaw rotor system 22 can control the rotation or yaw of the vehicle. Thus, the current disclosure provides for the combination of the best of current unmanned aerial vehicles on the market today with helicopter technology.

Looking at the components of the vehicle, the yaw system or control unit 22 has a yaw arm 16 that extends the unit away from the main body. Certain embodiments provide for the yaw arm 16 extending away from the center of gravity of the vehicle. However, as opposed to the prior art of quadcopters in which each main rotor system is located 90 degrees from the two adjacent ones, embodiments of this disclosure provide that the "lifting units," or three main rotor systems, are located one-hundred twenty degrees (120°) away from each other, thereby providing the inherently stable triangle design.

Each main rotor systems 21 includes a pitch slider 1, autorotation hub 2, and gear 3, shown in more detail in subsequent drawings. The yaw rotor system 22 has a motor 4 and system servos 5. Likewise, the main rotor systems 21 have motors 6 and system servos 7. There are rear main rotor systems 8 and a front rotor system 30. The main body 13 includes electronics housing 18.

Figure 2:
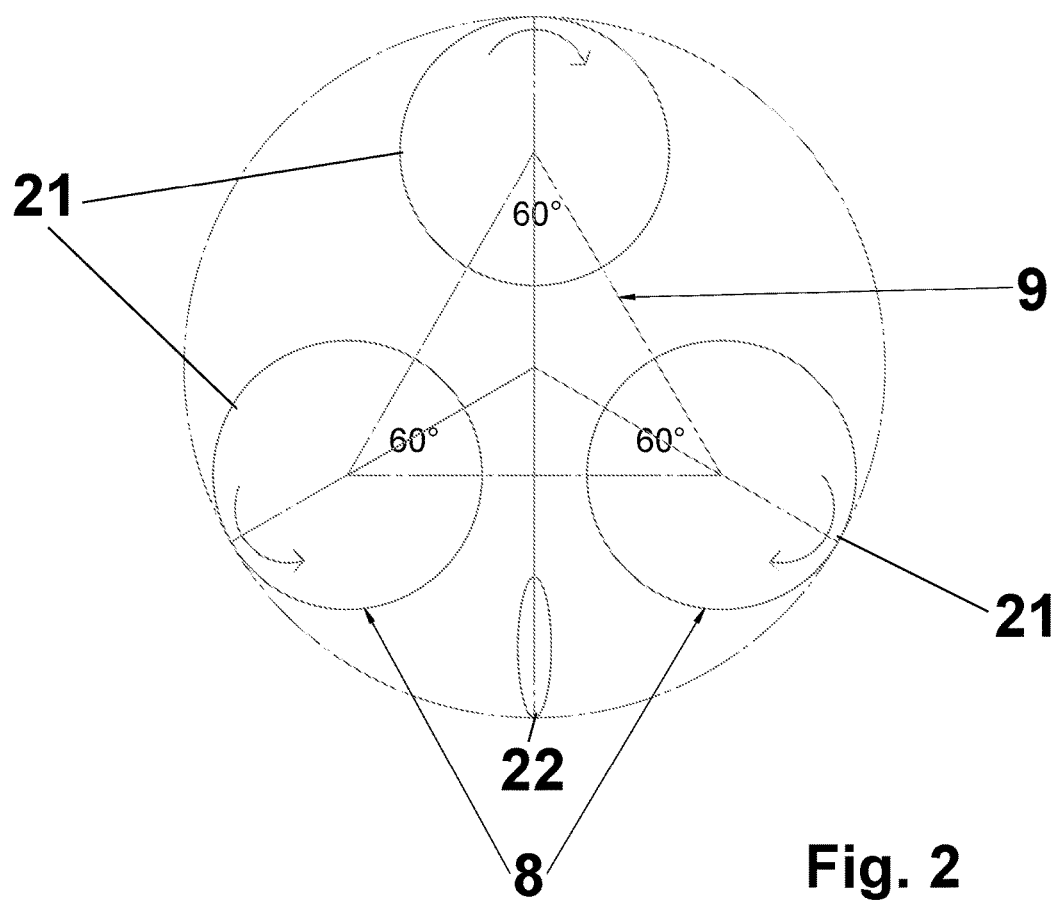
FIG. 2 is a diagram of rotor placement and direction of rotation for a vehicle according to selected embodiments of the current disclosure.

FIG. 2 is a diagram of rotor placement and direction of rotation for a vehicle according to selected embodiments of the current disclosure. The main rotor systems 21 are equidistant from the other main rotor systems 21, whereby each is 120° from the other. The center point of each propeller of the main rotator system forms an equilateral triangle 9. The two rear main rotor systems 8 rotate in opposite directions, as indicated in this figure, thereby cancelling the torque or yaw applied to the vehicle from each of these two rear main rotor systems 8. As will be appreciated by those skilled in the art, the propellers of the rear main rotor systems 8 may rotate in a direction opposite of that indicated in this figure while achieving the same functional purpose. The yaw rotor system 22 is located between the two rear main rotor systems 8, and in this embodiment, is equidistant between the two rear main rotor systems 8.

As discussed in more detail below, the three main rotor systems may consist of two pivoting or rotating rotors systems and a fixed front rotor system, each of which are 120° away from the other. The yaw rotor system 22 is located in between the two main rear rotor systems 8 so as not to disrupt the spacing of the "lifting" propeller units. The purpose of the yaw rotor system, or yaw control unit, is to give the user some rotational control over the vehicle without having to use the "lifting propellers" to do this work. This saves significantly on battery power since the current prior art changes the speed of the lifting propellers to control yaw. There is also an electronics housing 18 integrated with the main body 13 that houses batteries, Antenna/GPS, and other electronics therein for 3D communications. The front rotor system 30, or front propeller unit, helps to control the vertical location of the vehicle and, as one corner of an equilateral triangle, provides inherent stability to the vehicle.

Because each of the three "lifting propellers" is located 120 degrees from the two adjacent ones, the invention avoids the retreating blade stall problems that limit the forward speed at which helicopters fly.

Figure 3:
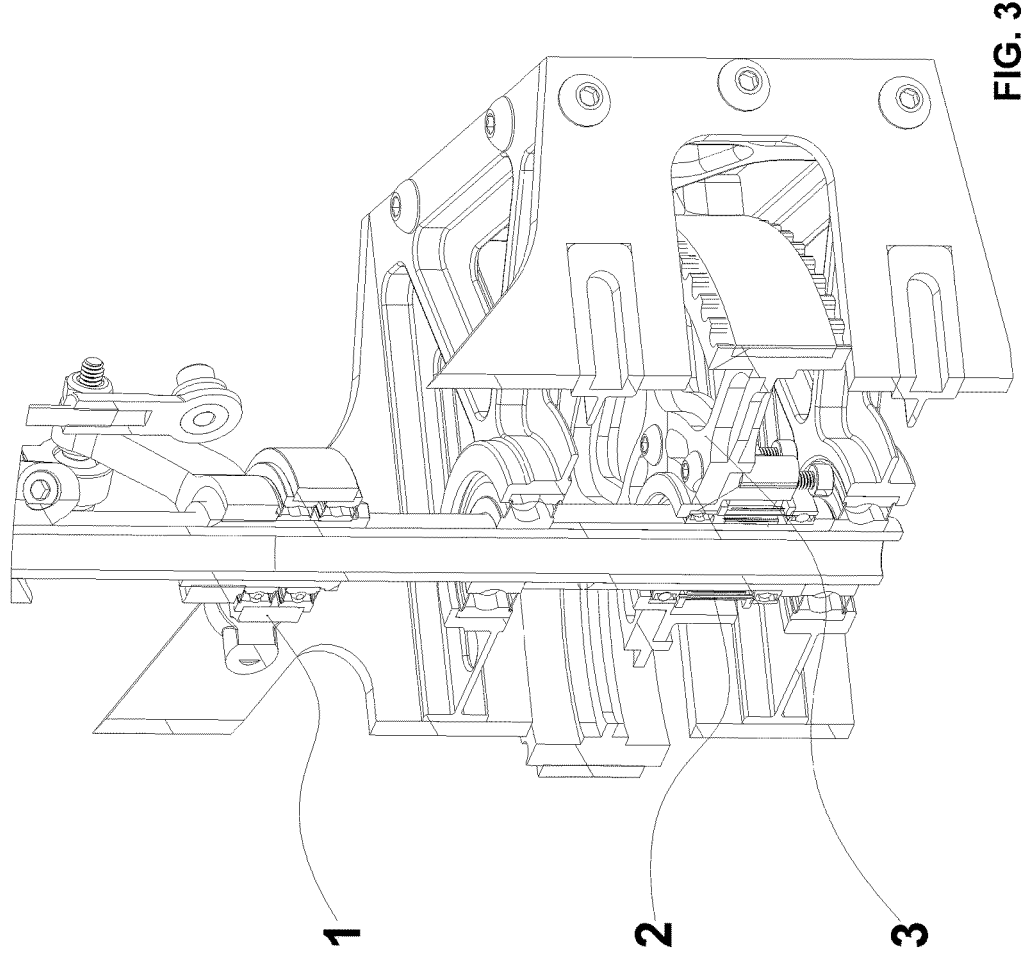
FIG. 3 is a cutaway perspective view of a portion of a rotor system of a vehicle according to selected embodiments of the current disclosure.

FIG. 3 is a cutaway perspective view of a portion of a rotor system of a vehicle according to selected embodiments of the current disclosure. This portion of the rotor system includes a pitch slider 1 that controls the pitch of the propeller blades rotating about its axle. A gear 3 drives the axle via an autorotation hub 2. As discussed below, the autorotation hub 2 allows for the propellers to continue spinning or rotating even though the gear 3 may have stopped rotating, for example, due to a motor that has stopped.

Figure 4:
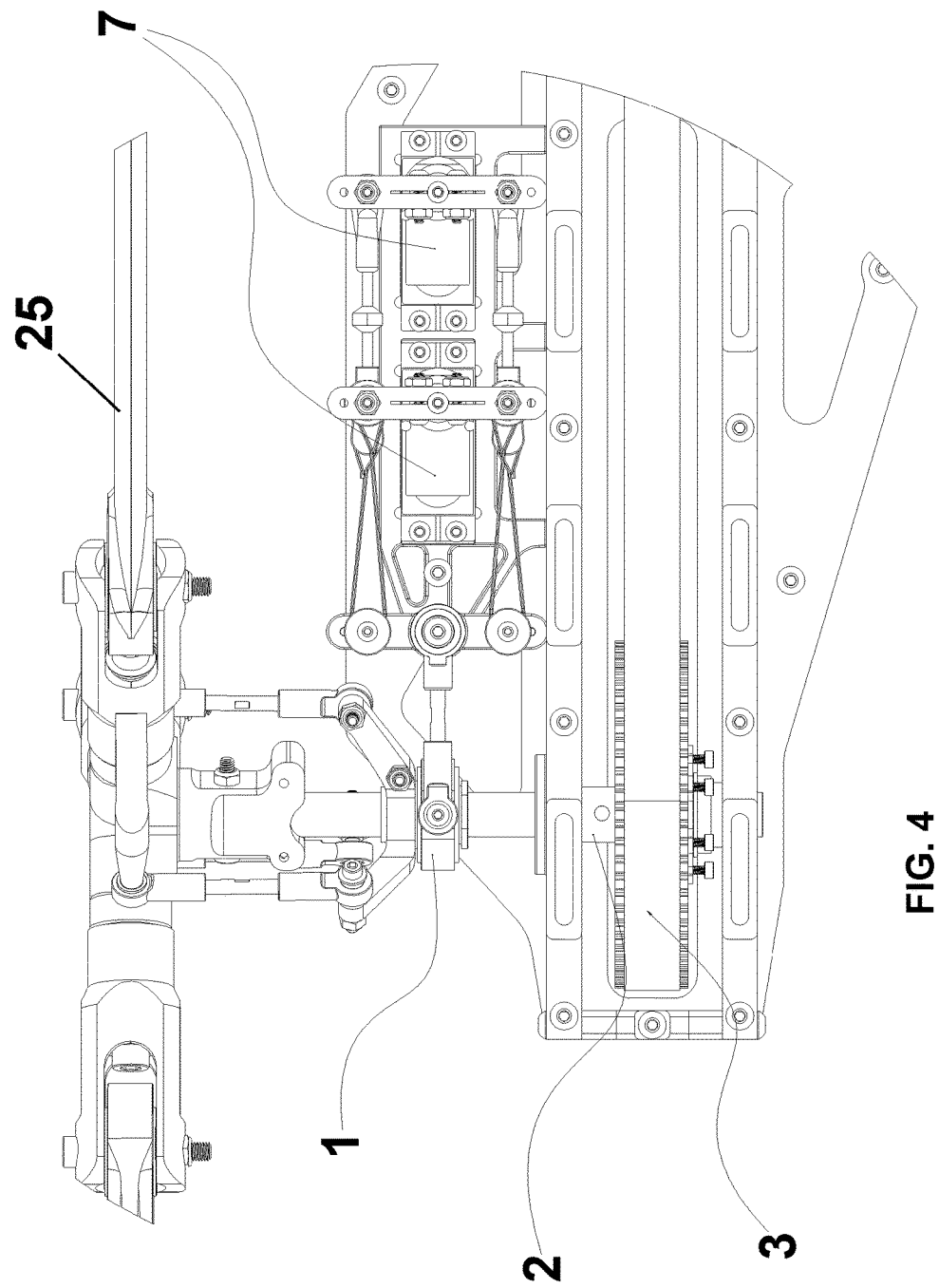
FIG. 4 is a cutaway side view of a portion of a rotor system of a vehicle according to selected embodiments of the current disclosure.

FIG. 4 is a cutaway side view of a portion of a rotor system of a vehicle according to selected embodiments of the current disclosure. The rotor system includes a gear 3 that drives an autorotation hub 2, which then in turn drives the propellers 25. System servos 7 drive a pitch slider 1, which in turn causes the blades of the propeller 25 to change pitch. Multiple system servos 7 are used to create a level of redundancy, whereby if a single system servo 7 fails, the other system servo 7 may nonetheless continue driving the pitch slider 1.

Figure 5:
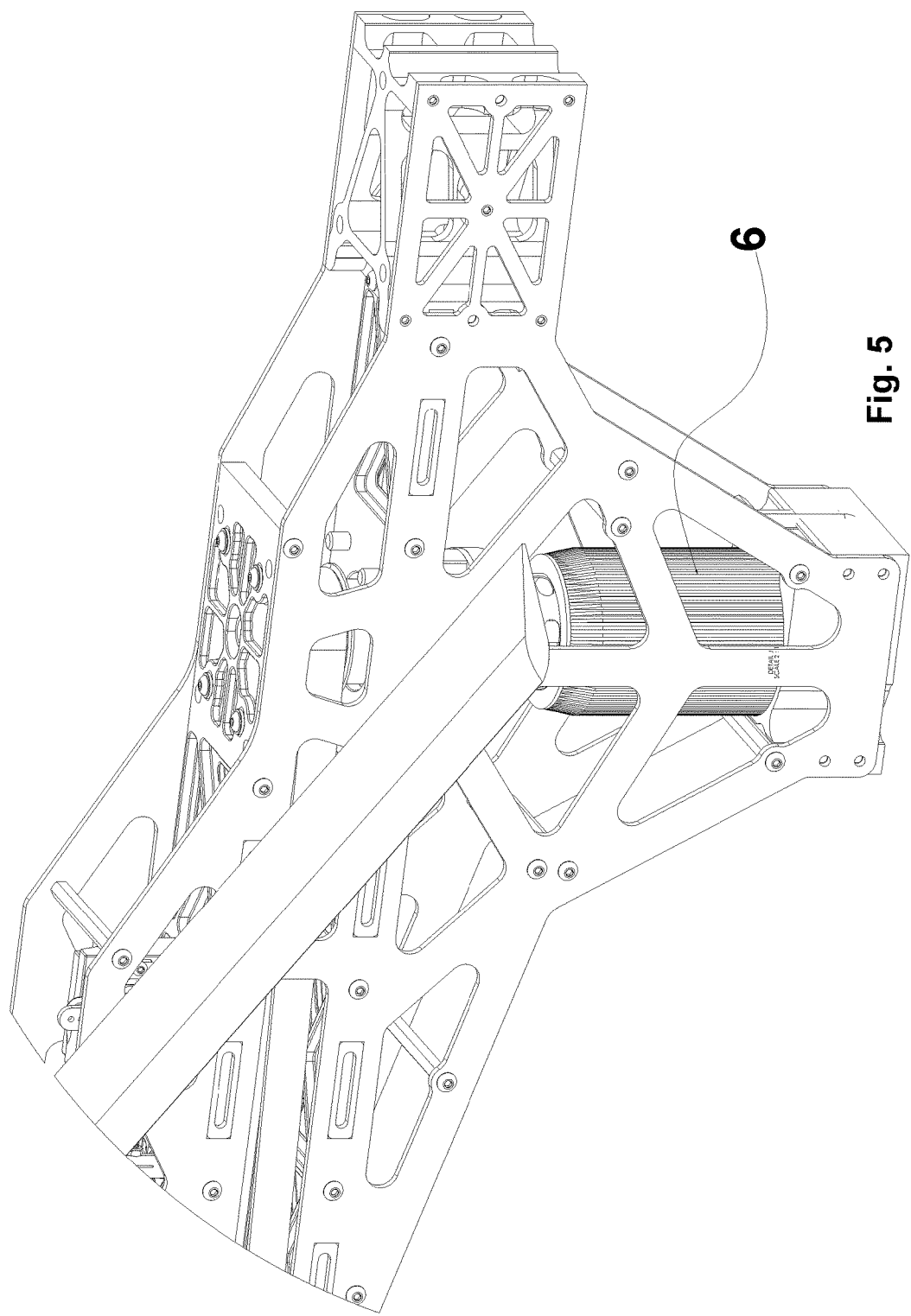
FIG. 5 is a perspective view of a portion of a rotor system of a vehicle according to selected embodiments of the current disclosure.

FIG. 5 is a perspective view of a portion of a rotor system of a vehicle according to selected embodiments of the current disclosure. A motor, or rotor drive 6, provides power to rotate the propellers via the gear and autorotation hub discussed above.

Figure 6:
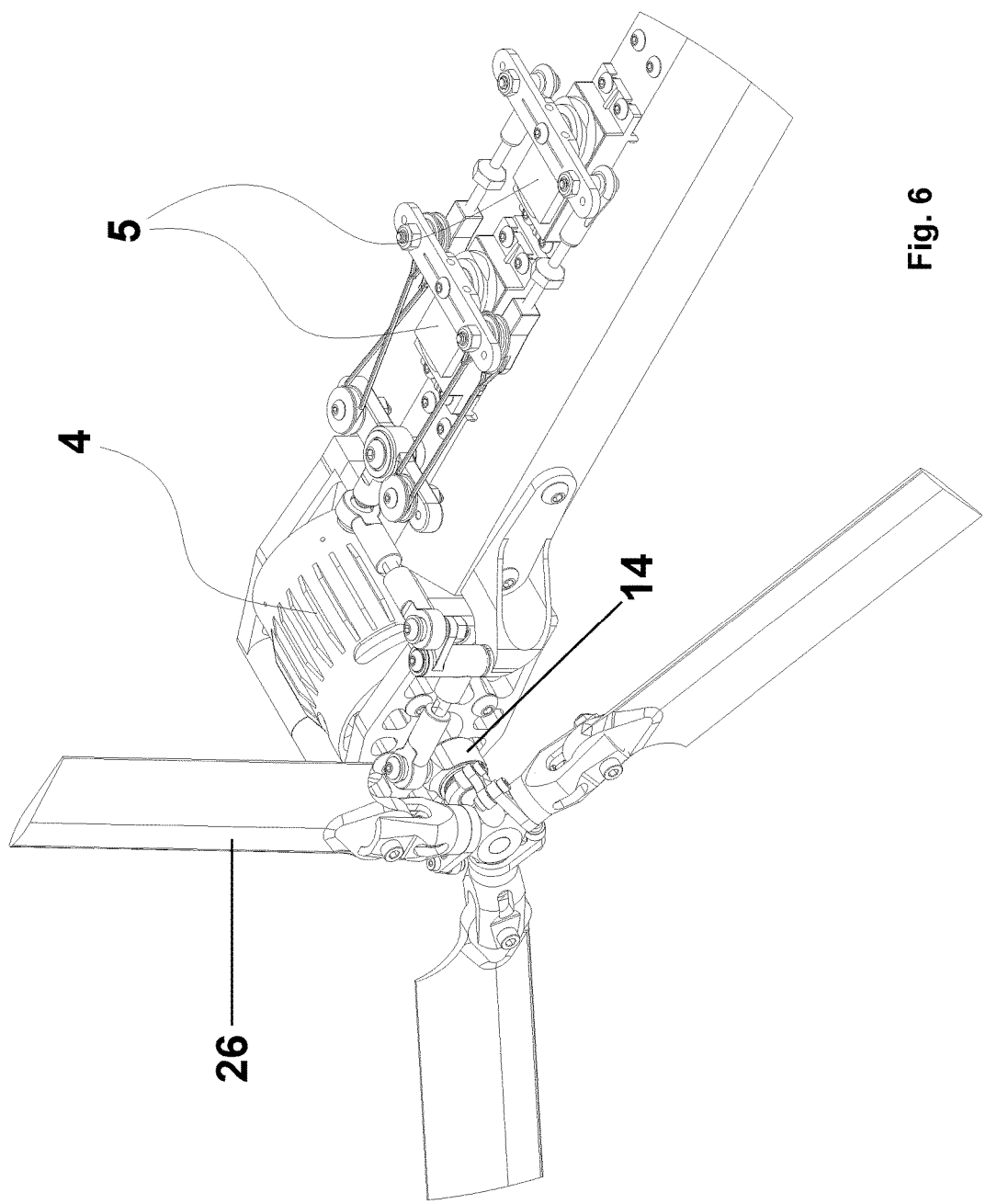
FIG. 6 is a perspective view of a yaw system according to selected embodiments of the current disclosure.

FIG. 6 is a perspective view of a yaw system according to selected embodiments of the current disclosure. The yaw system includes a motor, or rotor drive 4 that provides rotational power to the propeller 26. The rotor drive 4 of the yaw system is mounted horizontally, compared to the vertical orientation of the rotor drive 6 of the main rotor systems. System servos 5 drive a pitch slider 14, which in turn causes the blades of propeller 26 to change pitch. Multiple system servos 5 are used to create a level of redundancy, whereby if a single system servo 5 fails, the other system server 5 may nonetheless continue driving the pitch slider 14.

Figure 7:
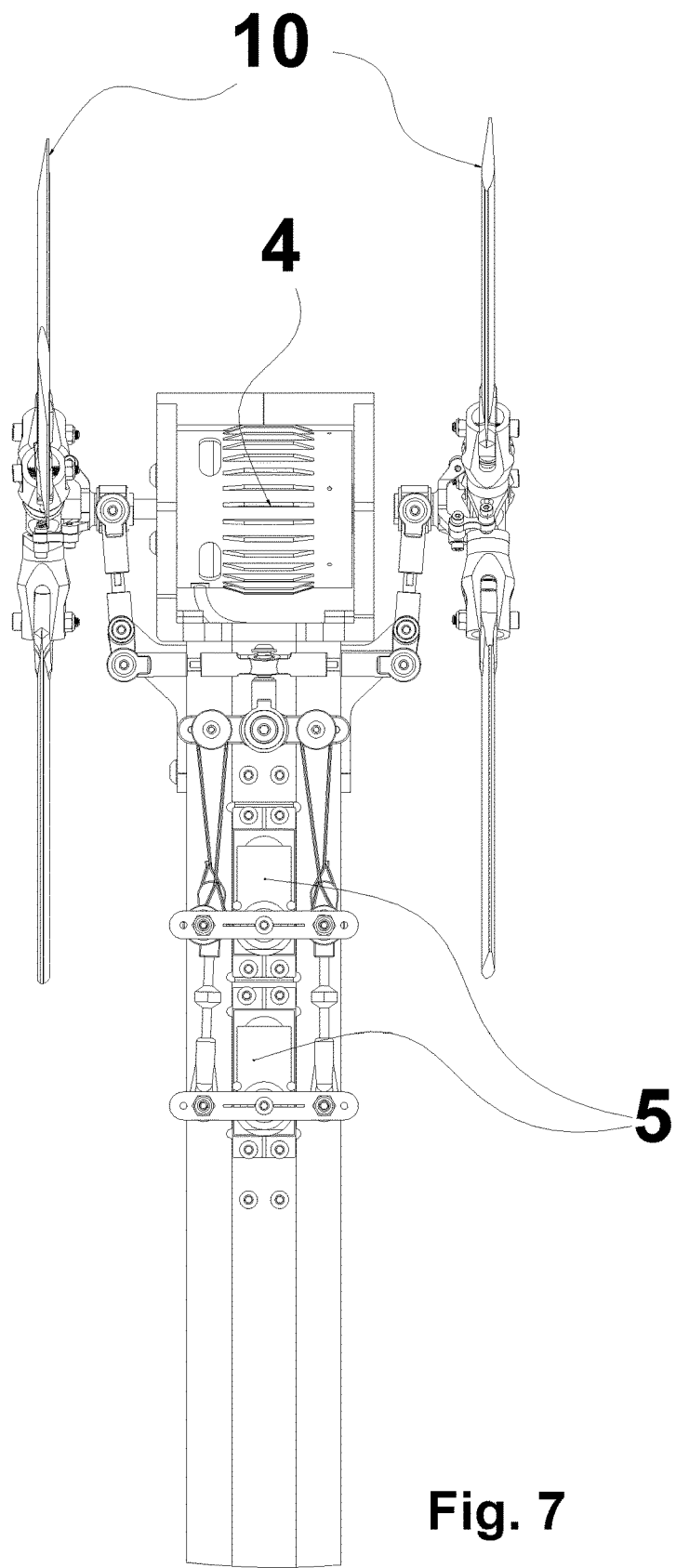
FIG. 7 is a top view of a yaw system with redundant rotors according to selected embodiments of the current disclosure.

FIG. 7 is a top view of a yaw system with redundant rotors according to selected embodiments of the current disclosure. As with the embodiment shown in FIG. 6, the rotor drive 4 is mounted horizontally, but in this embodiment, drives two propellers 10. While particular embodiments provide for the two propellers 10 rotating in the same direction, counter rotating propellers, that is propellers rotating in opposite directions, reduce the net torque applied by the rotating propellers on the yaw system and consequently the main body. System servos 5 drive a pitch slider, which in turn causes the blades of the propellers to change pitch. Multiple system servos 5 are used to create a level of redundancy, whereby if a single system servo 5 fails, the other system server 5 may nonetheless continue driving the pitch slider.

Particular embodiments of the current disclosure provide for the aerial vehicle having two pivoting rear main rotor systems, which are very similar in shape and design to the front rotor system 30, but they additionally have a pivot section built into the rotor system arm that allows the unit to be set at different angles to allow for different movement of the vehicle. It is important to note that in between the yaw rotor system 22 and the main rotor systems 21, there is no need to change the speed of any one propeller to affect the yaw or angle of the vehicle; these units can operate at or near full speed all the time, thereby allowing for a more efficient operation and longer battery life. The variable pitch aspect of this invention avoids the need to accelerate and decelerate individual engines, and it also avoids the swashplate complexity, cost, and maintenance that are required to build and maintain a helicopter—even a toy one. Running the propellers continuously at or near maximum power is a more efficient way to power a vehicle and results in great movement capabilities for the same amount of battery power as compared with a drone that wastes power winding up and window down its engines constantly. Because of the more efficient power feature, vehicles according to the current disclosure can use smaller propellers that do the prior art drones, which provides important space-saving features, particularly for drone flyers who travel with their drones.

Figure 8:
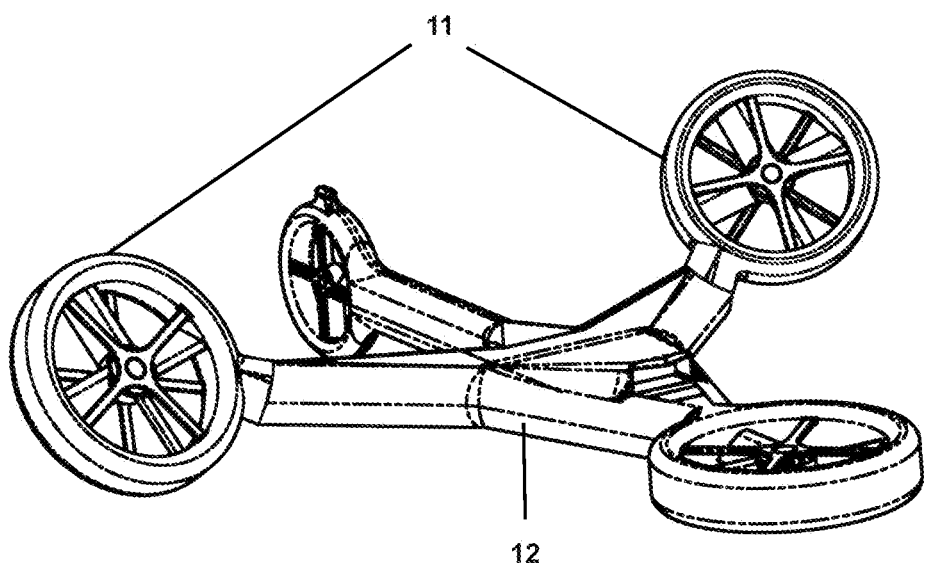
FIG. 8 is a perspective view of an unmanned aerial vehicle according to selected embodiments of the current disclosure.

FIG. 8 is a perspective view of an unmanned aerial vehicle according to selected embodiments of the current disclosure. Two of the three main rotor systems are tiltrotor systems 11, whereby the angle of the rotor system may be changed to angle the propellers of that rotor system. The tilt rotor systems 11 rotate relative to the fuselage 12. As can be seen in this figure, the title rotors rotate about an axis that is off center from the longitudinal axis of that rotor system. Rotation about the longitudinal axis of the rotor system would cause the propellers to angle towards or away from the yaw system, and provide counter-acting forces which reduce efficiencies. Instead, by rotating about an off center axis, the tilt rotors can be angled such that each is providing substantially all or all forward and vertical thrust (that is a thrust causing the vehicle to move forward), with little to now horizontal or side to side thrust.

It should be noted that the main rotor systems have the capacity to disengage from the engine gearing of the main drive system in the event of a power loss through the use of auto-rotation hubs. The disengagement allows for auto-rotation of the blade, which will slow the descent of the unit. Current drones have propellers that are "locked" to the gearing that connects them to the motors, so if power fails, the propellers are frozen into position (at least until the drone hits the ground at full gravitational speed, which usually results in the propellers, camera and other sensitive parts of the drone being broken off if not completely destroyed). The auto-rotation hub acts similar to that of a bicycle wheel and gear system, whereby power is applied to the wheel (propeller) when pedaling (motor provides power), but the wheel (propeller) is allowed to freely rotate when not pedaling (loss of power from motor).

Because the lifting propellers are used only for flying, the vehicle can use propellers that are smaller than those currently on similar sized unmanned aerial systems. This saves money, but also saves space, which is very important. For a serious UAS operator, having a vehicle that can be packed compactly for travel is very important, as most flyers want to take their drones as carryon items. In addition, by having fewer moving (and non-moving parts), as compared with current drones, the vehicles disclosed herein are relatively less expensive to build, and less expensive to maintain.

In terms of providing electrical power, rechargeable batteries are contemplated as one source of power. It is envisioned that alternative sources of power may be utilized, including power plants like anti-gravity engines or any elements, i.e.; element 116 from the Periodic Table of Elements, whose atomic characteristics are feasible for the production of clean and sustainable alternative sources of energy.

To make the vehicles disclosed herein, the components can be made with known machine tools from known materials in known ways. For instance, components of this device can be made with computer aided drafting (CAD) or computer aided machining (CAM) possible on a computer numerical control (CNC) machine. These known materials can include existing materials as well as composites of existing materials. It is expected that plastic and plastic composites will be primarily used to make the body portions and the propellers.

The power sources could be any of a variety of known sources such as internal combustion engines, electric engines, turbine engines, fuel cells, ramjet, pulse jet, nuclear, solar, as well as power regenerative type systems. Any fly-by-wire flight controller can be used for flight manipulation. Alternative variable pitch system can be used to transfer rotational energy from the engine into variable thrust. The variable pitch thrust system can be controlled through the use of any of the following: servos, actuators, hydraulics, or magnetic coils such as hard drive actuators. By utilizing a variable pitch system, it has been determined that this vehicle can achieve 99.9% efficiency by allowing the power plant to run at its optimum efficiency. A one-way hub is used in order to make the variable pitch system auto-rotation capable. The disengagement of the vertical rotors from the drive system through the use of a one-way hub allows the rotors to gain or maintain speed as it slowly descends back to the ground. Although this vehicle is balanced on its center of gravity, it is not critical and the vehicle can compensate for added weight off of its center of gravity. Its center of gravity can be defined by finding the center of the equilateral triangle between the three 120 degree vertical rotors. The anti-torque yaw system also utilizes a variable pitch propeller system for maximum control. Both vertical lift and anti-torque yaw variable pitch systems can be powered either through a gear/gear, belt/gear, shaft/gear, motor/gear type systems or directly. A turbine engine may be used in place of the variable pitch system.

In another embodiment, the vehicle has a solid shell that encapsulates the main body, thereby providing the additional benefit of waterproof capabilities. In this embodiment, there are three distinct "types" of propeller units: A front unit that remains horizontally oriented, two pivoting propeller units that can pivotally rotate to give enhanced control (both in the air and under water) to the user of the vehicle, and a yaw control unit, which incorporates helicopter technology to control the yaw of the unit.

By pivoting the two tiltrotor systems forward, the propeller units provide forward thrust. The yaw control unit trails behind as a sort of rudder which can be used to control the yaw and direction of the drone. Notice how all or nearly all of the battery power used by the pivoting propeller units can be used to "fly the drone", as the yaw control unit controls rotation and provides directional control.

The waterproof body of the drone could contain ballast tanks that are selectively flooded and emptied to direct the vehicle under water or back up to the surface. In the submersible version, there would be additional corrosion inhibitors built into the joints between the various parts. As with the solely-aerial version, the tilting propeller units would the provide the "thrust" and the yaw control unit would "steer" the drone.

Selected embodiments of the current disclosure provide for a vehicle that is usable in both air and water because of its advanced design. Ballast tanks are provided that can be opened and purged to give the vehicle a negative or positive buoyancy. To propel the vehicle in its submersible phase, the same propellers that provide lift on land will be used. Because the propellers can pivot forward, they can act just like a propeller on a regular ship or submarine. The vehicle in this embodiment will have a waterproof body with adequate pressure compensating fittings and other additional waterproofing parts, along with either a physical cable connection or some other means of communication with the vehicle while it is underwater. For example, the user could rely upon predetermined way point programming, where the user sets a "map" of the direction he/she wants the vehicle to travel before the vehicle enters the water. Alternatively, the vehicle could rely on the use of sonar-like systems to build itself a virtual environment and send information back above sea level to show vehicle's progress and location. The vehicle could also use surface ships as repeaters, and or satellite navigation. This list of examples of control is not meant to be restrictive in any way, and any known means of communicating with a machine under water, or in pre-programming movement of a machine under water is contemplated as potentially working with the vehicle disclosed herein.

Embodiments of the current disclosure incorporate the aspects of fixed wing aircraft, helicopters and current drones to create a vehicle with superior handling, battery life, and safer operation, in both air and aquatic environments, including operation on the surface of an aquatic environment.

It is also relevant that these technologies could be used on large scale vehicles, capable of carrying cargo or humans. The energy-saving and superior control technologies are relevant to mini-drones the size of a person's hand, and full size aerial vehicles the size of a 747 or A-380 airplane, or even as large as the "super blimps" being proposed that are thousands of feet long. The technology is applicable to any flying object, regardless of size, and with any surface/submersible object, regardless of size.

It should be understood that while the preferred embodiments of the invention are described in some detail herein, the present disclosure is made by way of example only and that variations and changes thereto are possible without departing from the subject matter coming within the scope of the following claims, and a reasonable equivalency thereof, which claims I regard as my invention.

That which is claimed:

1. A passenger vehicle comprising:
a fuselage having a front portion and a rear portion;
a main rotor system connected to the fuselage, wherein the main rotor system further comprises a front independent rotor system disposed on the front portion of the fuselage and a first and second rear independent rotor systems disposed on the rear portion of the fuselage, wherein each of the independent rotors systems are positioned on the fuselage in a fixed equilateral triangular configuration and wherein each of the independent rotor systems comprises a swashless variable pitch rotor and a variable speed motor; and
a yaw rotor system disposed on a distal end of an elongated yaw arm wherein the yaw arm is connected to the rear portion of the fuselage at a proximal end such that the yaw rotor system is in a fixed position distal to each of the first and second rear independent rotor systems and wherein the yaw rotor system comprises a swashless variable pitch rotor and a variable speed motor.

2. The vehicle of claim 1, wherein the first and second rear independent rotor systems are tiltrotor systems.

3. The vehicle of claim 1, wherein each of the independent rotor systems of the main rotor system comprises an actuator for controlling the pitch of the variable pitch rotor.

4. The vehicle of claim 1, wherein each of the independent rotor systems of the main rotor system comprises multiple actuators for controlling the pitch of each of the associated variable pitch rotors.

5. The vehicle of claim 1, wherein each of the independent rotor systems of the main rotor system further comprises an autorotation hub.

6. The vehicle of claim 1, wherein each of the independent rotor systems of the main rotor system comprises a gear, where the variable speed motor associated with each of the independent rotor systems drives the gear, where the gear in turn drives the variable pitch rotor.

7. The vehicle of claim 1, wherein each of the independent rotor systems of the main rotor system further comprises an autorotation hub and a gear, where the variable speed motor associated with each of the independent rotor systems drives the gear, where the gear in turn drives the autorotation hub, which in turn drives the variable pitch rotor.

8. The vehicle of claim 1, wherein each of the independent rotor systems of the main rotor system is one-hundred twenty degrees away from the other two independent rotor systems of the main rotor system.

9. The vehicle of claim 1, wherein the yaw rotor system provides rotational control over the vehicle.

10. The vehicle of claim 1, wherein the variable pitch rotor of each of the independent rotor systems of the main rotor system comprises a pitch slider.

11. The vehicle of claim 1, wherein each of the independent rotor systems of the main rotor system comprises multiple actuators, wherein the variable pitch rotor of each rotor system of the main rotor system comprises a pitch slider, where each actuator drives the pitch slider of its respective rotor system of the main rotor system.

12. The vehicle of claim 1, wherein the rotors of each of the first and second rear independent rotor systems rotate in counter directions to each other.

13. An unmanned aerial system comprising:
a fuselage having a front portion and a rear portion;
a main rotor system connected to the fuselage, wherein the main rotor system further comprises a front independent rotor system disposed on the front portion of the fuselage and a first and second rear independent rotor systems disposed on the rear portion of the fuselage, wherein each of the independent rotors systems are positioned on the in a fixed equilateral triangular configuration and wherein each of the independent rotor systems comprises a swashless variable pitch rotor, multiple actuators, a variable speed motor and an autorotation hub
wherein the multiple actuators control the pitch of the variable pitch rotor; and
a yaw rotor system disposed on a distal end of an elongated yaw arm wherein the yaw arm is connected to the rear portion of the fuselage at a proximal end such that the yaw rotor system is in a fixed position distal to each of the first and second rear independent rotor systems and wherein the yaw rotor system comprises a swashless variable pitch rotor and a variable speed motor.

14. The unmanned aerial system of claim 13, wherein the first and second rear independent rotor systems of the main rotor system are tiltrotor systems.

15. The unmanned aerial system of claim 13, wherein each of the independent rotor systems of the main rotor system further comprises a gear, where the associated variable speed motor drives the gear, where the gear in turn drives the autorotation hub, which in turn drives the associated variable pitch rotor.

16. The unmanned aerial system of claim 13, wherein each of the independent rotor systems of the main rotor system is one-hundred twenty degrees away from the other two independent rotor systems of the main rotorsystem.

17. The unmanned aerial system of claim 13, wherein the yaw rotor system provides rotational control over the unmanned aerial system.

18. The unmanned aerial system of claim 13, wherein the variable pitch rotor of each of the independent rotor systems of the main rotor system comprises a pitch slider, where the multiple actuators drive the pitch slider to control the pitch of the variable pitch rotor.

19. The vehicle of claim 13, wherein the rotors of each of the first and second rear independent rotor systems rotate in counter directions to each other.

\* \* \* \* \*